F. GOODWIN.
FRUIT GATHERER.
No. 18,582.  Patented Nov. 10, 1857.
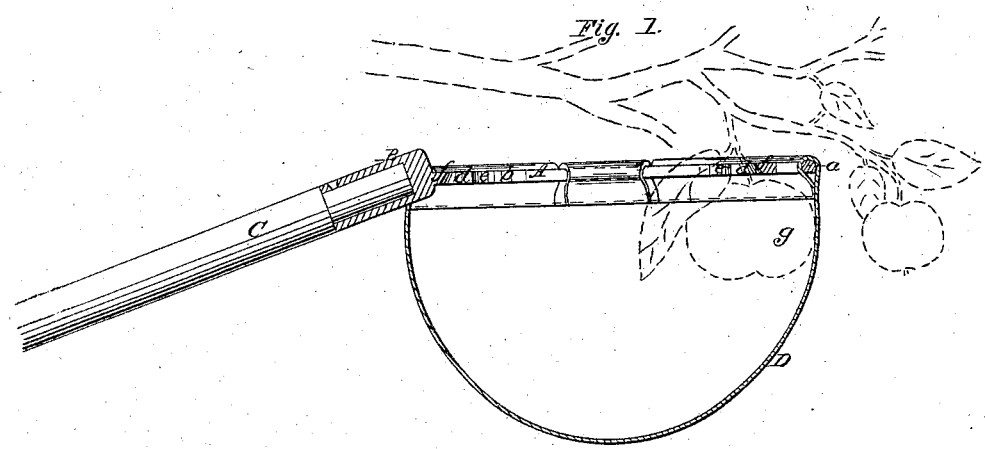
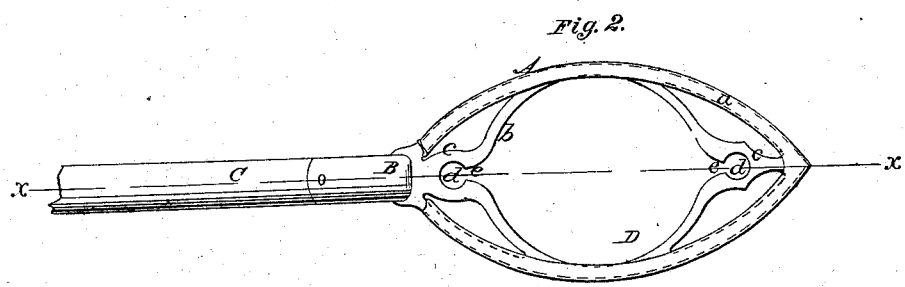

UNITED STATES PATENT OFFICE.

FIRMAN GOODWIN, OF ASTORIA, NEW YORK.

IMPROVEMENT IN FRUIT-GATHERERS.

Specification forming part of Letters Patent No. 18,582, dated November 10, 1857.

*To all whom it may concern:*

Be it known that I, F. GOODWIN, of Astoria, in the county of Queens and State of New York, have invented a new and Improved Implement or Device for Gathering Fruit; and I do hereby declare that the following is a full, clear, and exact description of the same, reference being had to the annexed drawings, making a part of this specification, in which—

Figure 1 is a longitudinal section of my improvement, taken in the line $x\ x$ of Fig. 2. Fig. 2 is a plan or top view of the same.

Similar letters of reference indicate corresponding parts in the two figures.

This invention consists in providing a metallic frame so formed as to serve the purpose of a rim for a bag which receives the fruit, and also to serve as a means to detach the fruit from the limbs. The frame is attached to a handle of proper length, and the whole is so arranged that the operator may gather or pluck the fruit very expeditiously and without injuring the same.

To enable those skilled in the art to fully understand and construct my invention, I will proceed to describe it.

A represents the frame, which may be formed of cast metal. Cast-iron will probably be the material used. The frame is composed of a rim, $a$, of elliptical form, having a socket, B, at one end to receive the end of a pole or staff, C, which serves as the handle of the implement. The socket B is not in the same plane as the frame A, but has an angular or oblique position relatively with it, as shown clearly in Fig. 1. Within the elliptical rim $a$ there is an annular rim, $b$, at two opposite points of which, and in line with the major diameter of the rim $a$, there are projections $c$, which are connected with the rim $a$. Through each projection $c$ there is a circular opening, $d$, and these openings communicate with the interior of the annular rim $b$ by means of passages $e$ made in the projections. The form of the frame is distinctly shown in Fig. 2. It is quite a light casting, the two arms $a\ b$ being of equal thickness, and the under side of the openings $d$, at their outer edges or parts, being inclined or beveled, as shown at $f$, so as to form a sharp edge at their upper surfaces.

D is a bag formed of any suitable cloth or material. This bag is secured to the rim $a$, and may be made of any suitable depth or capacity.

The implement is used as follows: The operator grasps the pole or staff C and elevates it, placing the frame A underneath the part $g$ to be picked, (shown in red in Fig. 1,) the point passing through the rim $b$, and the frame A is so moved that the stem by which the fruit is attached to the limb will be within either of the openings $d$. The operator then suddenly jerks the pole or staff either toward or from him, according to which opening the stem is in, and the fruit will be plucked from the limb and will drop into the bag D.

This implement is designed more especially for plucking or gathering apples; but it may be used for gathering other fruit, such as peaches, plums, and the like.

I would remark that the beveled or oblique sides $f$ of the openings $d\ d$ may be faced with steel, if desired, to form cutters to cut the stems; but this is not strictly essential, for the stems, by a slight shove or pull of the implement, are easily detached from their limbs.

This improvement may be constructed at trifling expense, as the frame and socket are cast in one piece and the cost of the handle and bag is quite small.

Having thus described my invention, what I claim as new, and desire to secure by Letters Patent, is—

The frame A, formed of the elliptical and annular rims $a\ b$ and socket B, the socket having an oblique position relatively with the frame, the outer, $a$, having the bag D attached, and the rim $b$ provided with the projections $c\ c$ and openings $d\ d$, substantially as and for the purpose set forth.

FIRMAN GOODWIN.

Witnesses:
  MICH. HUGHES,
  W. TUSCH.